United States Patent
Akiyoshi et al.

(10) Patent No.: US 6,886,616 B2
(45) Date of Patent: May 3, 2005

(54) WHEEL STRUCTURE

(75) Inventors: Yasuji Akiyoshi, Nagoya (JP);
Toshihiro Moriya, Okazaki (JP);
Hiroshi Yamauchi, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/442,714

(22) Filed: May 21, 2003

(65) Prior Publication Data

US 2003/0197422 A1 Oct. 23, 2003

Related U.S. Application Data

(63) Continuation of application No. 09/688,420, filed on Oct. 16, 2000, now Pat. No. 6,648,421.

(30) Foreign Application Priority Data

Oct. 15, 1999 (JP) .............................................. 11-293658

(51) Int. Cl.⁷ ............................................... B60C 19/00
(52) U.S. Cl. ....................... 152/154.1; 301/5.1; 301/9.1
(58) Field of Search ........................... 301/6.91, 95.101, 301/95.105, 95.107, 95.109, 154.1; 152/379.3, 386, 379.5, 381.3, 381.4, 154.1; 295/7; 307/5.1

(56) References Cited

U.S. PATENT DOCUMENTS

| | | | | | |
|---|---|---|---|---|---|
| 3,664,405 | A | * | 5/1972 | Poyner | 152/375 |
| 4,186,623 | A | * | 2/1980 | Friedericy et al. | 74/572 |
| 4,561,482 | A | * | 12/1985 | Tavazza et al. | 152/381.4 |
| 4,572,265 | A | | 2/1986 | Lescoffit | 152/379.3 |
| 4,606,390 | A | | 8/1986 | Shute | 152/381.4 |
| 5,826,949 | A | | 10/1998 | Bortoloni | 301/97 |
| 6,074,015 | A | * | 6/2000 | Renard et al. | 301/6.91 |
| 6,309,026 | B1 | | 10/2001 | Svedhem | 301/6.91 |
| 6,450,225 | B2 | * | 9/2002 | Yukawa et al. | 152/381.6 |

FOREIGN PATENT DOCUMENTS

| | | | | | |
|---|---|---|---|---|---|
| GB | 2026958 | A | * | 2/1980 | ........... B60C/15/02 |
| JP | 63130412 | A | * | 6/1988 | ........... B60C/19/00 |

* cited by examiner

Primary Examiner—Frantz F. Jules
(74) Attorney, Agent, or Firm—Kimms & McDowell LLP

(57) ABSTRACT

A wheel structure for vehicles, capable of reducing a columnar resonance sound occurring in a wheel during a travel of a vehicle. A cross-sectional shape of a closed space defined by a wheel and a tire is varied in the circumferential direction so that a columnar resonance frequency in the closed space varies with a rotation of a wheel unit.

2 Claims, 6 Drawing Sheets

WHEEL STRUCTURE

This is a Continuation Division of application Ser. No. 09/688,420 filed Oct. 16, 2000, now U.S. Pat. No. 6,648,421.

FIELD OF THE INVENTION

The invention relates in general to an improvement in a wheel structure for vehicles. More specifically, the invention relates to reducing noise caused by a wheel structure.

DESCRIPTION OF THE RELATED ART

FIG. 10 is a schematic diagram of a wheel which has heretofore been used, and which will be described with reference to FIG. 10. It has heretofore been known that columnar resonance occurring in a closed space defined by a tire 1 and a wheel 10 causes the deterioration of a load noise during vehicle travel. To be more exact, the columnar resonance is a resonance sound occurring when random vibration inputted from a road surface into the tire vibrates the air in the closed space 5 to cause a resonance phenomenon to occur in the vicinity of a columnar resonance frequency of the closed space 5.

This columnar frequency is generally determined on the basis of an equation:

$$f = c/2\pi r$$

wherein (f) is a columnar resonance frequency, (c) a sound velocity, and (r) a distance between the center of a wheel and a radially intermediate portion 20 of the closed space but peaks of the columnar resonance frequency occur plurally in practice due to the deformation, which is ascribed to the weight of the vehicle, of a ground contacting surface of the tire. In any case, a cross-sectional shape of the closed space 5 is constant at all times irrespective of the rotation of the wheel 12. Therefore, in a related art wheel structure, a value of the (r) of the above equation becomes constant. Accordingly, columnar resonance occurs with the same columnar resonance frequency at all times, and the resonance sound becomes offensive to the ear.

As a method of eliminating noise from a wheel, Japanese Patent Laid-Open No. 11704/1997 discloses techniques for reducing a noise of a wheel by providing a substantially cylindrical ring including a layer formed of at least one viscoelastic material on an outer circumferential surface of the wheel to thereby absorb mechanical vibration of the wheel. However, these techniques do not fundamentally hold down the occurrence of a columnar resonance sound, so that a satisfactory noise reducing effect cannot be obtained.

SUMMARY OF THE INVENTION

The invention has been made in view of the above-mentioned circumstances, and provides a wheel structure for vehicles, capable of effectively reducing a noise occurring due to a columnar resonance sound in a closed space in a wheel.

According to an aspect of the invention, the wheel structure has a wheel, and a tire fitted on an outer circumference of the wheel, a cross-sectional shape of a closed space defined by the wheel and tire being varied in a circumferential direction thereof so that a columnar resonance frequency of the closed space varies with a rotation of the wheel.

According to another aspect of the invention, projections are provided in parts of an inner side of the closed space, whereby a cross-sectional shape of the closed space varies in the circumferential direction thereof.

According to still another aspect of the invention, the projections are provided on an outer circumferential surface of a rim portion of the wheel.

According to a further aspect of the invention, the projections are provided on an inner circumferential surface of a tread of the tire.

According to another aspect of the invention, the projections are provided on inner circumferential surfaces of side walls of the tire.

According to still another aspect of the invention, a length of each of the projections 15 is substantially ¼ of a circumferential length of the tire, two projections being provided in a circumferentially equally spaced manner.

According to a further aspect of the invention, a ratio of a cross-sectional area of each of the projections to that of the closed space which is not provided with the projection is set substantially not smaller than 2.5%.

According to another aspect of the invention, a circumferentially irregularly surfaced belt is fitted on an outer circumferential surface of the rim portion of the wheel to thereby circumferentially vary a cross-sectional shape of the closed space.

According to still another aspect of the invention, the outer circumferential surface of the rim portion of the wheel is formed irregularly in the circumferential direction to thereby circumferentially vary a cross-sectional shape of the closed space.

According to a further aspect of the invention, the closed space is formed so that a ratio of a length of a radially longest portion thereof to that of a radially shortest portion thereof becomes substantially not larger than 97%.

BRIEF DESCRIPTION OF THE DRAWINGS

Preferred embodiments of the invention will be described in detail on the basis of the following figures, wherein:

FIG. 9 is a schematic view of a wheel in another embodiment of the invention, wherein:

DESCRIPTION OF THE PREFERRED EMBODIMENTS

Figure 1:
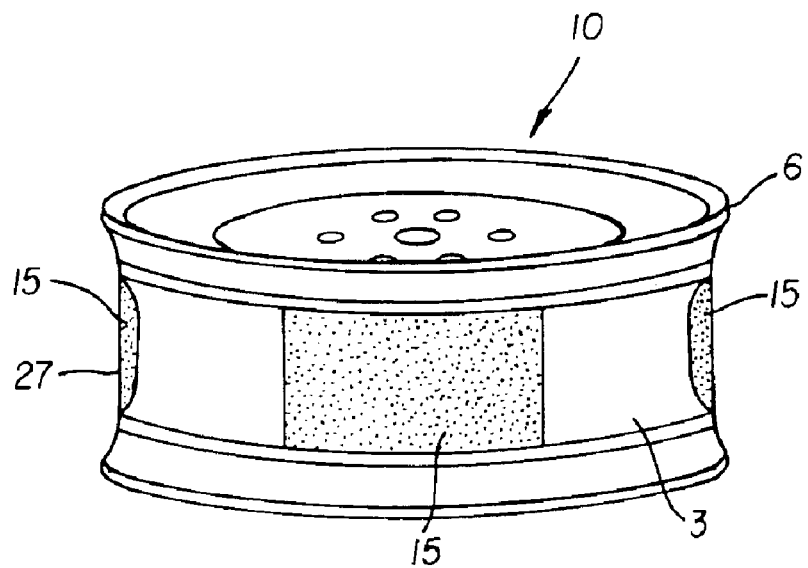
FIG. 1 is a perspective view of wheel in accordance with a first embodiment of the invention.

Different embodiments of the invention will now be described with reference to the drawings. FIGS. 1–5 show a first embodiment of the wheel structure for vehicles according to the present invention, FIG. 6 a second embodiment of the wheel structure for vehicles according to the present invention, FIG. 7 a third embodiment of the wheel structure for vehicles according to the present invention, FIG. 8 a fourth embodiment of the wheel structure for vehicles according to the present invention; and FIG. 9 another embodiment of the wheel structure for vehicles according to the present invention. Referring to FIGS. 1–9, structural parts identical with those of the above-described related prior art wheel structure will be designated by the same reference numerals.

Figure 3:
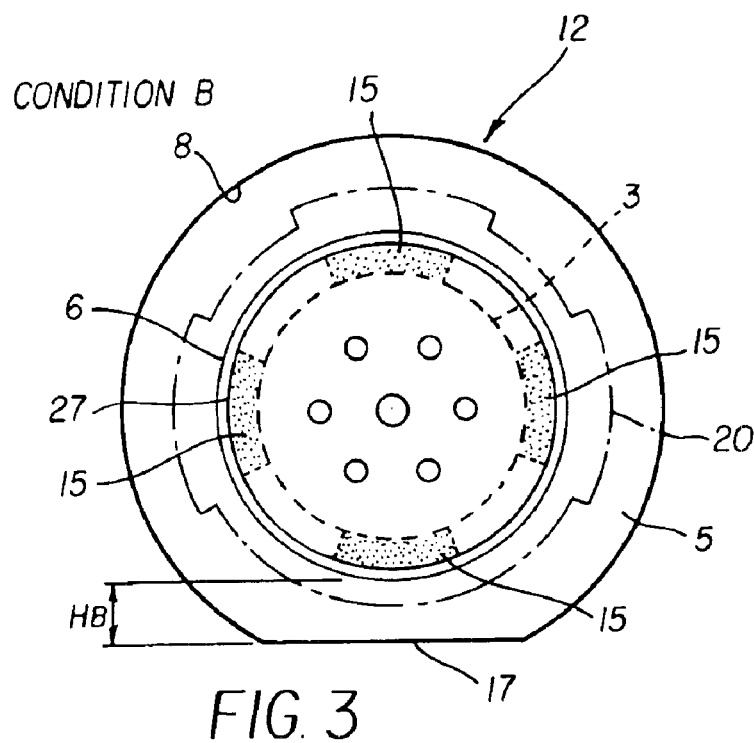
FIG. 3 is a schematic side view illustrating the operation of the wheel in FIG. 1.

As shown in FIG. 1, four side elevationally arcuate bulkheads (projections) 15 each of which has a length of about ⅛ of that of the whole of an outer circumferenctial surface 3 of a rim portion 6 of a wheel 10 of a vehicle are arranged at regular intervals on the same outer circumferential surface 3, whereby a cross-sectional shape of a closed space 5 enclosed with and defined by a tire 1 and a wheel 10, which constitute a wheel unit 12, is varied in the circumferential direction thereof as shown in FIG. 3.

Figure 2:
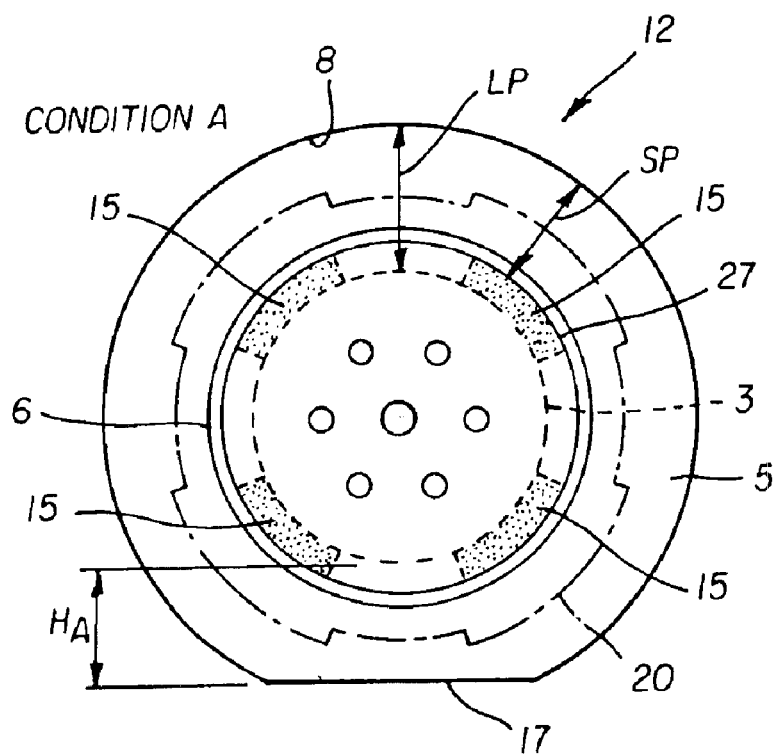
FIG. 2 is a schematic side view illustrating the operation of the wheel in FIG. 1.

The first embodiment of the wheel structure for vehicles according to the present invention is formed as described above. Accordingly, a columnar resonance frequency in the closed space in a condition A in which a bulkhead 15 does not exist as shown in FIG. 2 on the part of the outer circumferential surface 3 of the rim portion 6 which is opposed to a ground contacting surface 17 of the tire and that of the closed space in a condition B attained after the wheel unit in the condition A makes a substantially ⅛ turn to have a bulkhead 15 positioned on the above-mentioned part of the outer circumferential surface 3 are different. Referring to FIGS. 2 and 3, a reference numeral 20 denotes a radially intermediate portion of the closed space 5.

To be more exact, when the part of the outer surface of the tire which is just under the part of the rim portion 6 which has a bulkhead 15 contacts a ground surface, a distance $H_B$ between the portion of an inner circumferential surface 8 of the tire which corresponds to the ground contacting surface 17 of the tire and the portion of the outer circumferential surface 3 (a surface 27 of the bulkhead 15) of the wheel 10 becomes shorter by a level corresponding to the height of the bulkhead 15 than that $H_A$ between the mentioned parts in a case (condition A) where the part of the outer surface of the tire which is just under the part of the rim portion which does not have a bulkhead 15 contacts the ground surface. Therefore, the radially intermediate portion 20 of the closed space 5 is displaced toward the side of the outer circumferential surface of the wheel unit 12.

Figure 4:
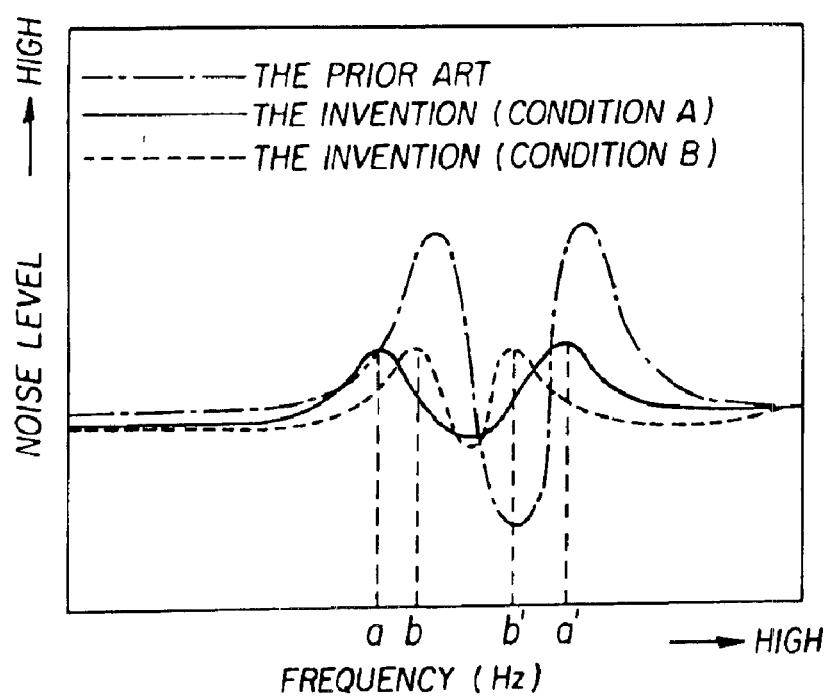
FIG. 4 is a diagram comparatively showing noise level characteristics with respect to a columnar resonance frequency in the first embodiment of the invention and those of a prior art wheel.
Figure 5:
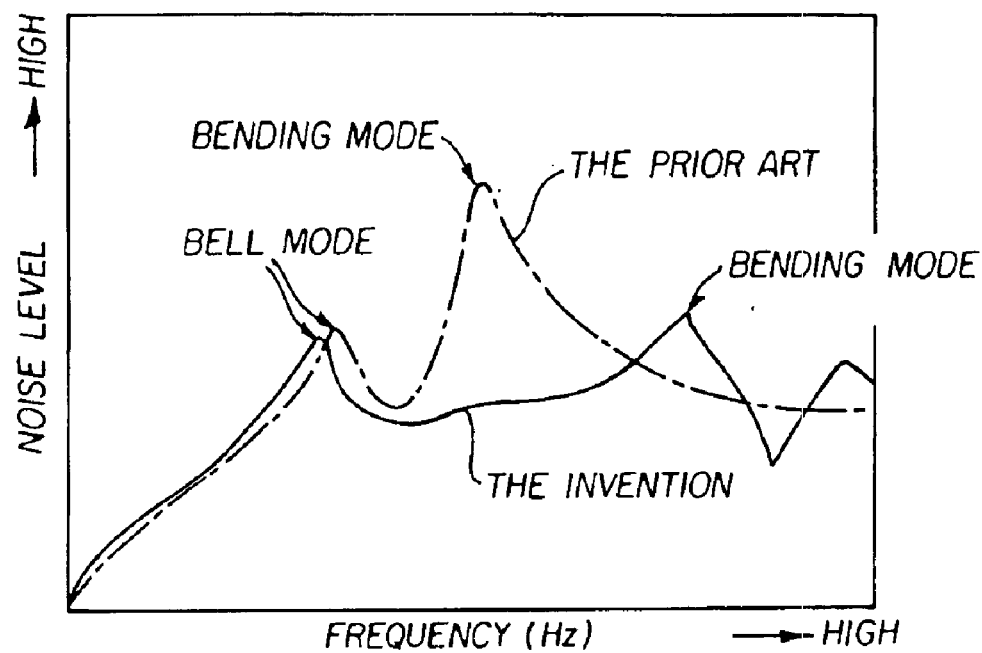
FIG. 5 is a diagram comparatively showing noise level characteristics with respect to a resonance frequency of the wheel in the first embodiment of the invention and those of a prior art wheel.

Accordingly, in the condition A, and B, the height in cross section of the ground contacting portion of the closed space 5 is different. Also, the position of the part of the radially intermediate portion 20 of the closed space which corresponds to the ground contacting portion of the tire is different. Since the columnar resonance frequency is determined in accordance with a distance.(r) between the center of a wheel unit and a radially intermediate portion 20 thereof as mentioned above, the columnar resonance frequencies in the respective condition become different. The columnar resonance frequency is varied continuously with the rotation of the wheel unit 12 between the levels a, a' (refer to a solid line designated by the word "Condition A") in the condition A and levels b, b' (refer to a broken line designated by the word "Condition B") in the condition B as shown in FIG. 4.

Consequently, in a related art wheel structure in which a columnar resonance frequency in a closed space 5 is constant irrespective of a rotation of a wheel unit 12, resonance (refer to a one-dot chain line designated by words "Prior Art") occurs with the same frequency at all times even when the wheel unit 12 is rotated. On the other hand, in the above-described mode of embodiment of the wheel structure, the columnar resonance frequency varies cyclically in every ¼ turn of the wheel unit 12, so that the length of the time during which resonance occurs with a single frequency decreases. Therefore, as shown by the solid line and broken line in FIG. 4, a noise level relative to a columnar resonance frequency becomes low. Moreover, since the columnar resonance frequency has various levels, a sound pressure level decreases, and this enables a driver to rarely feel noise.

When a noise level of columnar resonance lowers, an amplitude by vibration in a region of columnar resonance frequency transmitted to the wheel 10 also lowers, so that noise occurring due to the resonance of the wheel 10 ascribed to the columnar resonance can also be reduced.

The wheel 10 has characteristic frequencies of two modes, i.e. a bell mode in which both end portions in the longitudinal direction of a vehicle of the wheel 10 are displaced around a spindle in the opposite directions with respect to the widthwise direction of the vehicle, and resonate, and a bending mode in which the mentioned portions of the wheel are displaced around the spindle in the same direction with respect to the widthwise direction of the vehicle, and resonate. When these two characteristic frequencies exist in a frequency region in the vicinity of a columnar resonance frequency the amplitude of which is still larger than those of other frequencies out of the frequencies inputted into the wheel 10, the resonance of the wheel 10 is amplified, and this would render it unable to reduce the noise level effectively.

However, the characteristic frequency in the above-mentioned bending mode is proportional to a bending rigidity of the wheel 10, and that in the bell mode in inverse proportion to the weight of the wheel 10. Therefore, when the above-mentioned bulkheads 15 are provided on the outer circumferential surface 3, the bending rigidity of the wheel 10 is improved with the characteristic frequency in the bending mode increasing accordingly, the weight of the wheel 10 increasing with the characteristic frequency in the bell mode decreasing accordingly. Therefore, as shown by a solid line in FIG. 5, even when the characteristic frequencies of the wheel 10 are in the columnar resonance frequency region, the two characteristics can be removed from the columnar resonance frequency region by regulating the thickness of, a material for, and the weight of the bulkheads 15. This can prevent the amplification (refer to a one-dot chain line in FIG. 5) of resonance of the wheel 10 which readily occurs in a related art wheel structure.

Figure 6:
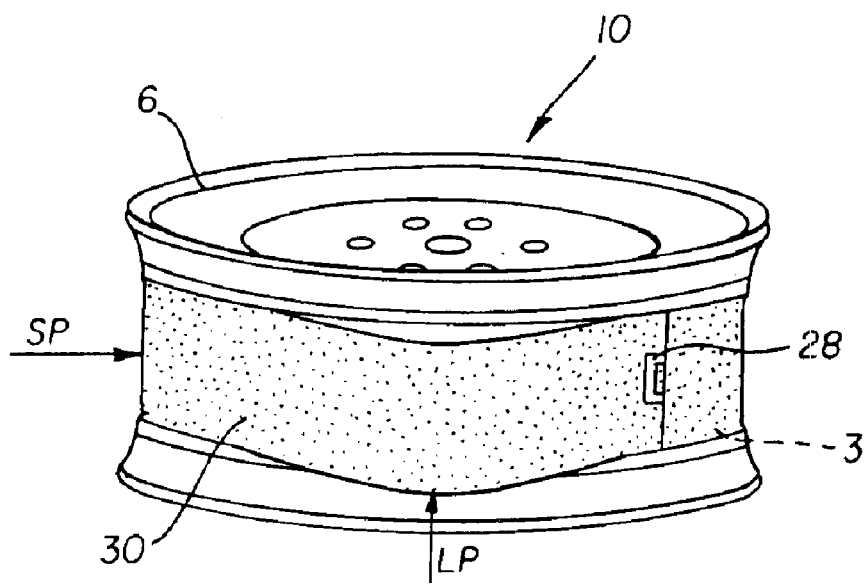
FIG. 6 is a perspective view of a wheel in accordance with a second embodiment of the invention.

A second embodiment of the wheel structure for vehicles according to the invention will now be described. As shown in FIG. 6, in this wheel structure, a band 30 is wound around an outer circumferential surface 3 of a rim portion 6 of a wheel 10. This band 30 is provided with fastener portions 28 at both ends thereof, and has a continuous irregular shape in side elevation. The band is wound around the outer circumferential surface 3 of the rim portion 6 of the wheel 10, and fixed by combining with each other the fastener portions 28 at both ends thereof. Owing to this band 30, a cross-sectional shape of a closed space 28 is varied in the circumferential direction.

Since the second embodiment of the wheel structure for vehicles according to the invention is formed as described above, it is possible not only to effectively obtain a noise reducing effect substantially identical with that obtained in the above-described mode of embodiment but also to simplify the manufacturing step and carry out an after-band-fixing-operation.

A third embodiment of the wheel structure for vehicles according to the invention will now be described.

Figure 7:
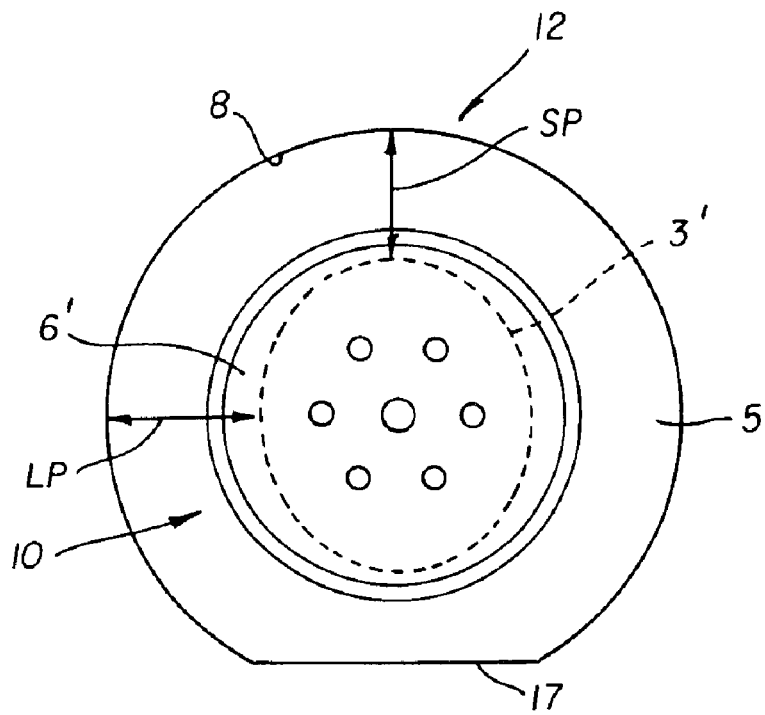
FIG. 7 is a schematic side view of a wheel in accordance with a third embodiment of the invention.

As shown in FIG. 7, an outer circumferential surface 3' of a rim portion 6' of a wheel 10 in this wheel structure is formed to a shape other than a true circular shape.

The third embodiment of the wheel structure according to the invention is formed in this manner so as to vary a cross-sectional shape of a closed space 5 in the circumferential direction. Accordingly, a noise reducing effect substantially identical with that of each of the above-described modes of embodiment is obtained.

Figure 8:
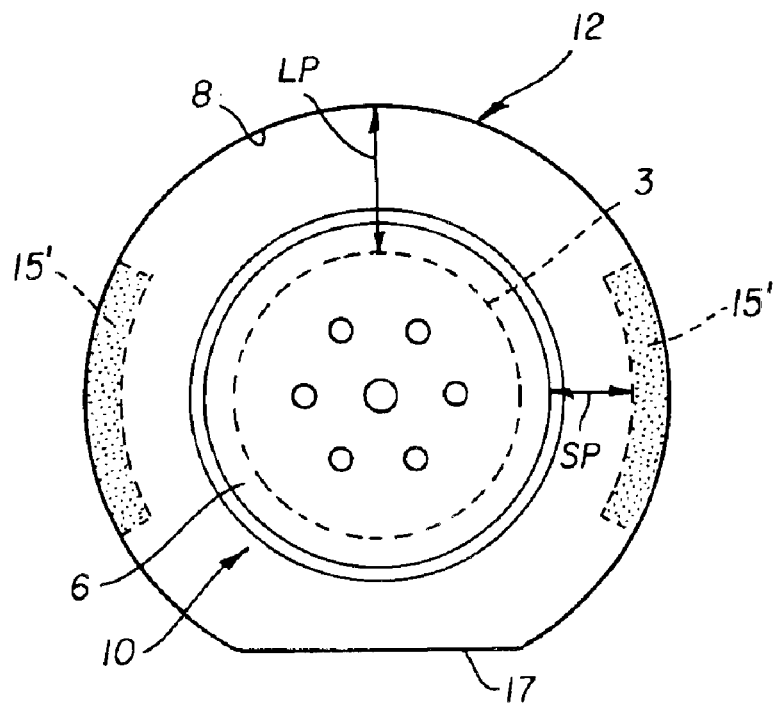
FIG. 8 is a schematic side view a wheel in accordance with a fourth embodiment of the invention.

A fourth embodiment of the wheel structure for vehicles according to the invention will now be described. As shown in FIG. 8, bulkheads 15' in this wheel structure are provided on parts of inner circumferential surface of a tire, whereby a cross-sectional shape of a closed space 5 is varied in the circumferential direction.

The fourth embodiment of the wheel structure according to the invention is formed in this manner so as to vary a cross-sectional shape of the closed space 5 in the circumferential direction. Accordingly, a noise reducing effect substantially identical with that in each of the above-described modes of embodiment is obtained.

In the above-described modes of embodiment, noise is reduced by forming the closed space so that the distance (r) (length of the radially intermediate line in the closed space 5) between the center of the wheel and the radially intermediate portion 20 of the closed space 5 varies with the rotation of the wheel unit 12 to thereby produce an effect in varying the columnar resonance frequency in the closed space 5 during the rotation of the wheel unit 12. Owing to the study made by the developers of the present invention, it has become clear that, even when the cross-sectional shape of the closed space 5 is varied so that the cross-sectional area of the closed space varies with the rotation of the wheel unit 12, the columnar resonance frequency in the closed space 5 can be varied by the rotation of the wheel unit 12.

Figure 9A:
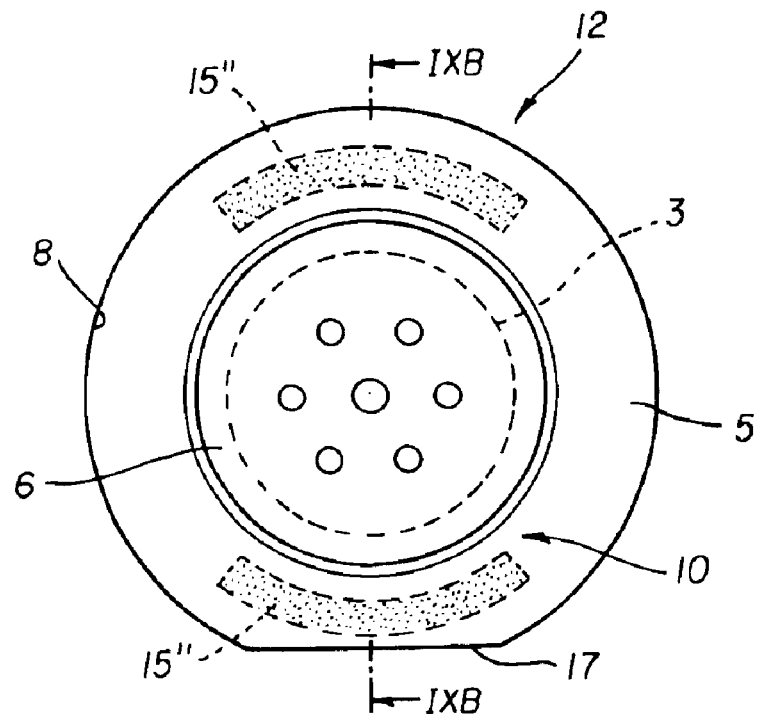
FIG. 9A is a side view.
Figure 9B:
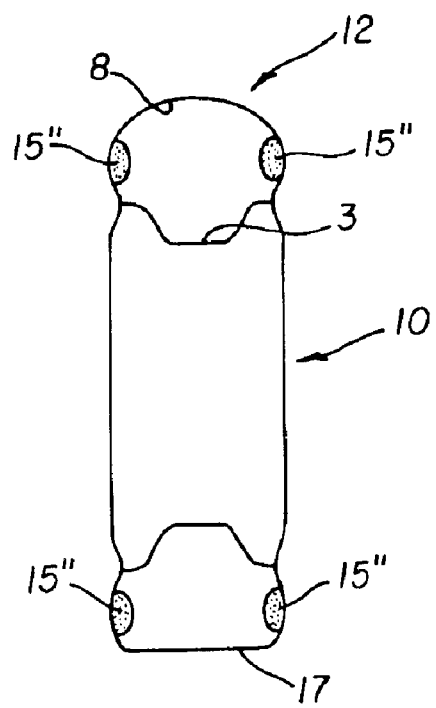
FIG. 9B is a schematic view showing a cross section taken along the arrow carrying line IXB—IXB of FIG. 9A.
Figure 10:
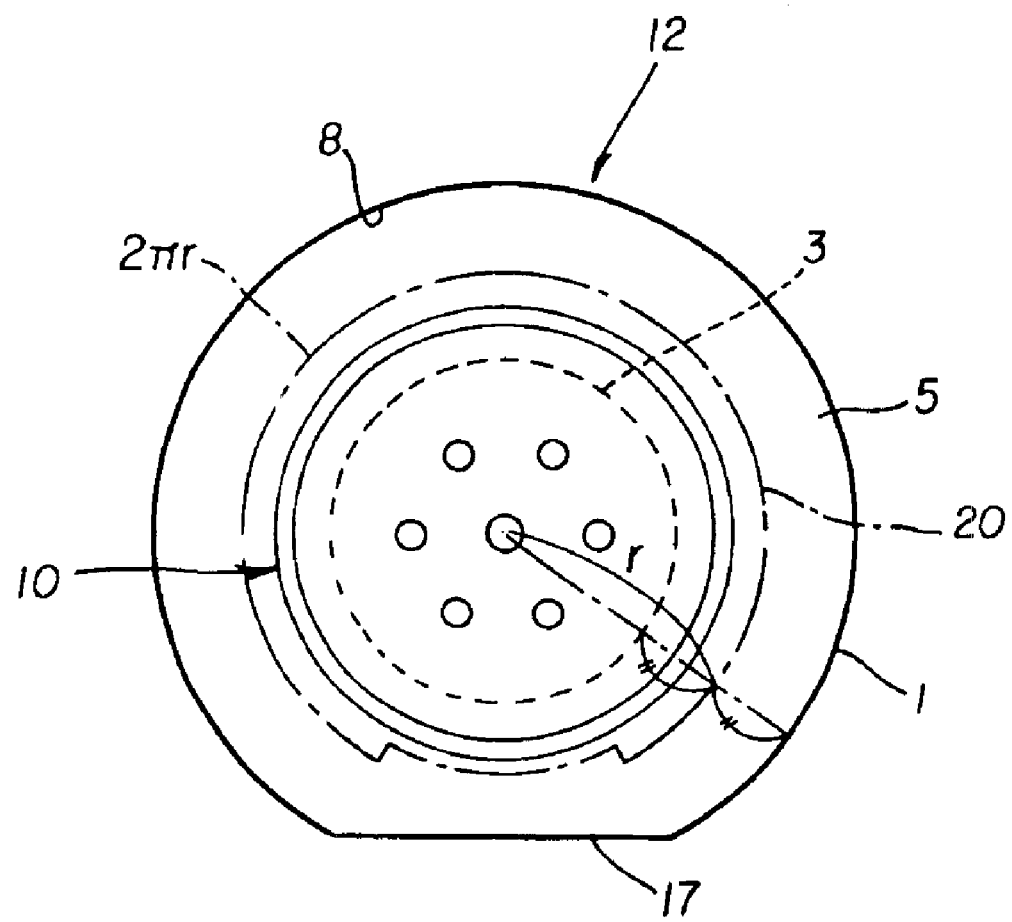
FIG. 10 is a schematic side view of a related prior art wheel.

For example, when bulkheads 15" are provided on inner surfaces of side portions of a tire with respect to the widthwise direction of the tire as shown in FIGS. 9A and 9B, the cross-sectional area of the portion of the closed space 5 which corresponds to the ground contacting surface 17 of the tire in the condition in which a bulkhead 15" exists in the mentioned portion and that of the same portion of the closed space 5 in the condition in which a bulkhead 15" does not exist in the same portion differ from each other. Therefore, noise can be reduced by varying the columnar resonance frequency by the rotation of the wheel unit 12 in the same manner as in the above-described modes of embodiment.

These embodiments are formed by arranging four or two bulkheads 15, 15' and 15". When the wheel structure is formed by arranging two bulkheads, each of which has a length substantially ¼ of the whole circumferential length of the outer circumferential surface 3 of the rim portion 6 of the wheel 10, on the inner surface of a tire or on the mentioned outer circumferential surface 3 at regular intervals, the time during which resonance occurs with a single columnar resonance frequency can be reduced most, and noise can also be lowered to the greatest extent.

When a distance of the radially shortest portion of the closed space 5 other than the portion corresponding to the ground contacting surface 17 of a tire is set not larger than 97% or substantially not larger than 97% (in other words when the closed space is formed so that a ratio of a length of a radially shortest portion (SP) thereof to that of a radially longest portion (LP) thereof becomes substantially not larger than 97% as shown in the figures), or, when the cross-sectional area of a bulkhead 15 is set not smaller than 2.5% (or substantially not smaller than 2.5%) with respect to that of the portion of the closed space 5 not provided with a bulkhead, the columnar resonance frequency can be staggered effectively, and a larger noise reducing effect is obtained.

In the wheel structure for vehicles according to the present invention described above, the time during which resonance occurs with a single columnar resonance frequency can be reduced, and a level of noise occurring due to columnar resonance can be lowered.

What is claimed is:

1. A wheel structure comprising:

a wheel; and a tire fitted on an outer circumference of the wheel;

two projections provided on a part of a closed space defined by the wheel and the tire and varying a cross-sectional shape of a closed space defined by the wheel and the tire in the circumferential direction thereof, wherein only the two projections are provided in the circumferential direction so that a columnar resonance frequency in the closed space varies with a rotation of the wheel structure by varying the cross-sectional shape of the closed space in the circumferential direction thereof, and wherein the projections are provided on an inner circumferential surface of a tread of the tire.

2. A wheel structure comprising:

a wheel; and a tire fitted on an outer circumference of the wheel;

two projections provided on a part of a closed space defined by the wheel and the tire and varying a cross-sectional shape of a closed space defined by the wheel and the tire in the circumferential direction thereof, wherein only the two projections are provided in the circumferential direction so that a columnar resonance frequency in the closed space varies with a rotation of the wheel structure by varying the cross-sectional shape of the closed space in the circumferential direction thereof, and wherein the projections are provided on inner circumferential surfaces of side walls of the tire.

* * * * *